United States Patent
Jang

(10) Patent No.: US 8,924,075 B2
(45) Date of Patent: Dec. 30, 2014

(54) ELECTRIC POWER STEERING SYSTEM AND METHOD FOR VERIFYING STEERING ANGLE THEREOF

(71) Applicant: Mando Corporation, Pyeongtaek-si, Gyeonggi-do (KR)

(72) Inventor: Hyun-Seop Jang, Gyeonggi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 110 days.

(21) Appl. No.: 13/724,368

(22) Filed: Dec. 21, 2012

(65) Prior Publication Data

US 2013/0166142 A1 Jun. 27, 2013

(30) Foreign Application Priority Data

Dec. 22, 2011 (KR) ........................ 10-2011-0140120

(51) Int. Cl.

| | | |
|---|---|---|
| G06F 11/30 | (2006.01) | |
| B62D 6/08 | (2006.01) | |
| B60K 17/346 | (2006.01) | |
| G01L 5/22 | (2006.01) | |
| G01L 3/10 | (2006.01) | |
| B60K 23/08 | (2006.01) | |
| B62D 6/10 | (2006.01) | |

(52) U.S. Cl.
CPC ............... *B62D 6/08* (2013.01); *B60K 17/3462* (2013.01); *G01L 5/221* (2013.01); *G01L 3/104* (2013.01); *B60K 23/08* (2013.01); *B62D 6/10* (2013.01)
USPC ................................ 701/34.4; 701/41; 701/66

(58) Field of Classification Search
CPC .... B60K 17/3462; B60K 23/08; B60K 23/04; B62D 6/10; G01L 3/104; G01L 5/221; G01D 5/145
USPC .......... 701/34.4, 41, 66, 69, 84; 180/249, 446
See application file for complete search history.

(56) References Cited

U.S. PATENT DOCUMENTS

| | | | | |
|---|---|---|---|---|
| 4,794,536 | A * | 12/1988 | Eto et al. ........................... | 701/41 |
| 4,807,128 | A * | 2/1989 | Ikemoto et al. .................. | 701/38 |
| 4,860,457 | A * | 8/1989 | Beissbarth ................. | 33/203.18 |
| 5,212,642 | A * | 5/1993 | Tanaka et al. .................. | 701/41 |
| 5,301,769 | A * | 4/1994 | Weiss .............................. | 180/249 |
| 6,039,144 | A * | 3/2000 | Chandy et al. ................ | 180/446 |
| 6,050,360 | A * | 4/2000 | Pattok et al. ................... | 180/446 |
| 6,862,551 | B1 * | 3/2005 | Kang et al. ..................... | 702/151 |
| 7,076,395 | B2 * | 7/2006 | Ito ................................... | 702/151 |
| 7,201,069 | B2 * | 4/2007 | Sakabe ..................... | 73/862.31 |
| 7,358,719 | B2 * | 4/2008 | Kondo ....................... | 324/207.25 |
| 7,447,579 | B2 * | 11/2008 | Lee .................................. | 701/41 |
| 2007/0246290 | A1 * | 10/2007 | Deshmukh et al. ........... | 180/446 |

* cited by examiner

*Primary Examiner* — Gertrude Arthur Jeanglaude
(74) *Attorney, Agent, or Firm* — McDermott Will & Emery LLP

(57) ABSTRACT

An electric power steering system includes: a torque sensor including a first rotor connected to an input shaft, a second rotor connected to an output shaft, a first angle element for measuring an absolute steering angle of the first rotor, and second and third angle elements for measuring relative steering angles of the first rotor; and an electronic control unit for determining a reference steering angle based on the absolute steering angle and the relative steering angles received from the torque sensor, tracing and accumulating first and second absolute steering angles rotated from the reference steering angle based on the relative steering angles received from the second and third angle elements, and averaging the first and second absolute steering angles to provide the calculated final absolute steering angle when the difference between the accumulated first and second steering angles is within the preset reference difference.

6 Claims, 2 Drawing Sheets

ELECTRIC POWER STEERING SYSTEM AND METHOD FOR VERIFYING STEERING ANGLE THEREOF

CROSS-REFERENCE TO RELATED APPLICATION

This application claims priority from and the benefit under 35 U.S.C. §119(a) of Korean Patent Application No. 10-2011-0140120, filed on Dec. 22, 2011, which is hereby incorporated by reference for all purposes as if fully set forth herein.

BACKGROUND OF THE INVENTION

1. Field of the invention

The present invention relates to an electric power steering system and a method for verifying a steering angle thereof, and more particularly to an electric power steering system which calculates a final absolute steering angle when a difference between first and second absolute steering angles traced according to relative steering angles received from angle elements, respectively is within a reference difference, thereby improving a reliability of the final absolute steering angle, and a method for verifying a steering angle thereof.

2. Description of the Prior Art

As generally known in the art, a power steering system is applied to a vehicle as a means for mitigating a steering force of a steering wheel (handle) and securing a steering stability. As such power steering systems, existing hydraulic power steering (HPS) systems using a hydraulic pressure are widely used, but environment-friendly electric power steering (EPS) systems for helping steering of a driver by using a rotating force of a motor unlike the existing hydraulic method are being recently generally installed in the vehicle.

In such an electric power steering (EPS) system, an electronic control unit (ECU) drives a motor according to a travel condition of a vehicle detected by a speed sensor and a torque sensor to give a light and comfortable steering feeling during a low speed travel, give an excellent directional stability as well as a heavy steering feeling during a high speed travel, and allow a rapid steering in an emergency situation, thereby providing the driver with an optimum steering condition.

An electronic control unit of an electric power steering system according to the related art calculates a desired final absolute steering angle by using a first angle element for calculating an absolute steering angle, second and third angle elements for calculating relative steering angles, and a vernier algorithm.

However, since the electric power steering system according to the related art calculates a final absolute steering angle without verifying the relative steering angles received from the second and third angle elements, a reliability of the calculated final absolute steering angle is low. In particular, high reliability for an absolute steering angle is required as the ISO 26263 Standard is introduced.

SUMMARY OF THE INVENTION

Accordingly, the present invention has been made to solve the above-mentioned problems occurring in the prior art, and an object of the present invention is to provide an electric power steering system which calculates a final absolute steering angle when a difference between first and second absolute steering angles traced according to relative steering angles received from angle elements, respectively is within a reference difference, and a method for verifying a steering angle thereof.

In order to accomplish this object, there is provided an electric power steering system including: a torque sensor including a first rotor connected to an input shaft, a second rotor connected to an output shaft, a first angle element for measuring an absolute steering angle of the first rotor, and second and third angle elements for measuring relative steering angles of the first rotor; and an electronic control unit for determining a reference steering angle based on the absolute steering angle and the relative steering angles received from the torque sensor, tracing and accumulating first and second absolute steering angles rotated from the reference steering angle based on the relative steering angles received from the second and third angle elements, and averaging the first and second absolute steering angles to provide the calculated final absolute steering angle when the difference between the accumulated first and second steering angles is within the preset reference difference.

When the difference between the first and second absolute steering angles exceeds the reference difference, the electronic control unit maintains the first and second absolute steering angles accumulated before the exceeding.

The electronic control unit counts a number of times by which the difference between the first and second absolute steering angles exceeds the reference difference, and outputs preset alarm information when the counted number of times exceeds a predetermined number of times.

In accordance with another aspect of the present invention, there is provided a method for verifying a steering angle of an electric power steering system including a torque sensor including a first rotor connected to an input shaft, a second rotor connected to an output shaft, a first angle element for measuring an absolute steering angle of the first rotor, and second and third angle elements for measuring relative steering angles of the first rotor, the method including the steps of: determining a reference steering angle based on the absolute steering angle and the relative steering angles received from the torque sensor; tracing and accumulating first and second absolute steering angles rotated from the reference steering angle based on the relative steering angles received from the second and third angle elements; determining whether the difference between the accumulated first and second absolute steering angles is within a preset reference difference; and averaging the first and second absolute steering angles to provide the calculated final absolute steering angle when it is determined in the determining step that the difference between the accumulated first and second steering angles is within the preset reference difference.

The method further includes, after the determining step, the step of, when the difference between the first and second absolute steering angles exceeds the reference angle, maintaining the first and second absolute steering angles before the exceeding.

The providing step comprises the steps of: counting a number of times by which the difference between the first and second absolute steering angles exceeds the reference difference; and outputting preset alarm information when the counted number of times exceeds the predetermined number of times.

The present invention can calculate a final absolute steering angle when a difference between first and second absolute steering angles traced according to relative steering angles received from angle elements, respectively is within a reference difference, thereby improving a reliability of the final absolute steering angle, and a method for verifying a steering angle thereof.

Further, according to the present invention, since preset alarm information is output when the number of times by which the difference between first and second absolute steering angles exceeds a reference difference is a predetermined number of times, a driver can promptly recognize a malfunction of a torque sensor or a rotor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings.

Figure 1:
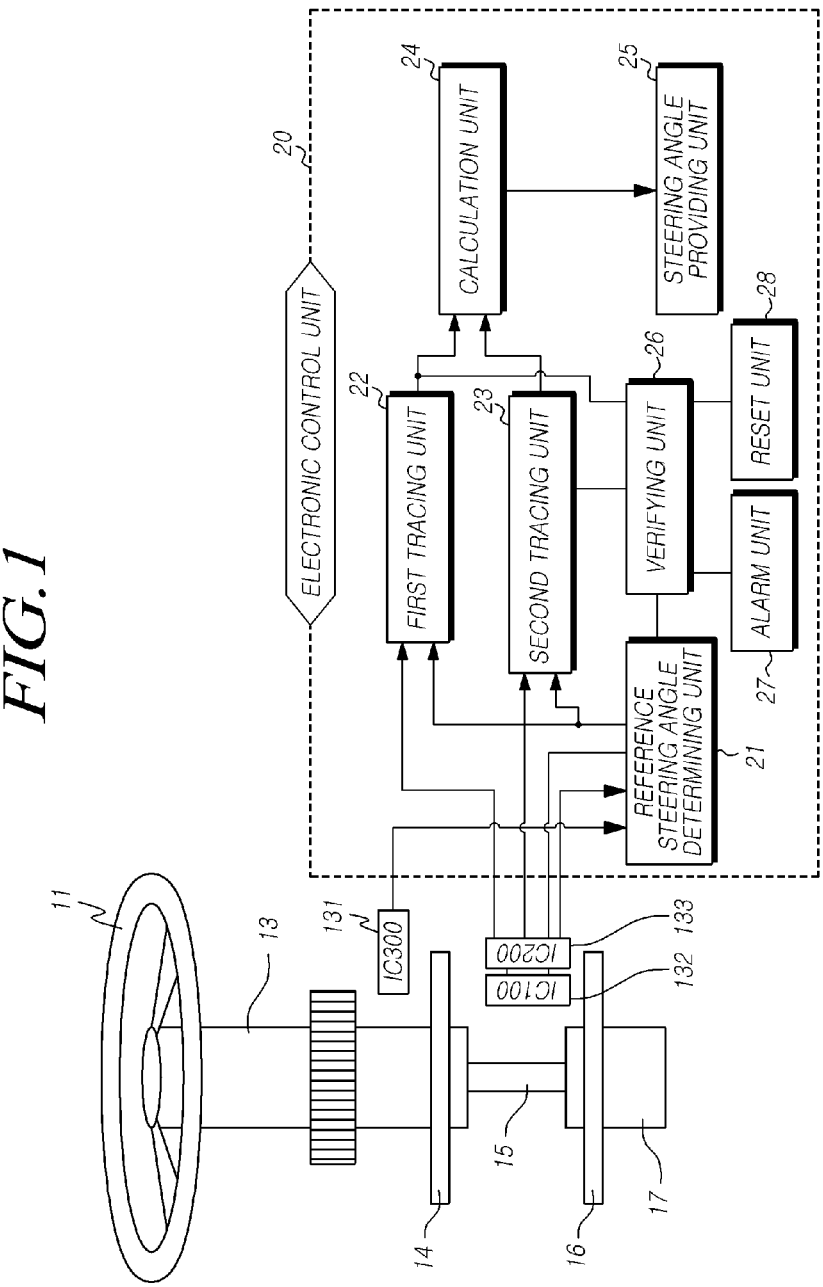
FIG. 1 is a view illustrating an electric power steering system according to an embodiment of the present invention.

FIG. 1 is a view illustrating an electric power steering system according to an embodiment of the present invention.

Referring to FIG. 1, the electric power steering system according to the embodiment of the present invention includes a torque sensor including a first rotor 14 and a second rotor 16, and an electronic control unit 20 for determining a reference steering angle based on detection information detected by the torque sensor, verifying relative steering angles received from second and third angle elements, and calculating a verified final absolute steering angle.

The first rotor 14 is connected to an input shaft 13, and the second rotor 16 is connected to an output shaft 17. The input shaft 13 may be coupled to a steering wheel 11 provided in a driver seat, and the output shaft 17 may be coupled to wheels. If the input shaft 13 is rotated by an external force, a rotating force of the input shaft 13 is transmitted to the output shaft 17 through a torsion bar 15, also rotating the output shaft 17.

The torsion bar 15 is provided between the first rotor 14 and the second rotor 16 to measure a torsion generated between the input shaft 13 and the output shaft 17.

A first angle element 131 provides an absolute steering angle of the first rotor 14 to the electronic control unit 20. The first angle element 131 may be disposed parallel to the first rotor 14.

The second and third angle elements 132 and 133 are disposed below the first rotor 14 to provide relative steering angles of the first rotor 14 to the electronic control unit 20, respectively.

The electronic control unit 20 determines a reference steering angle through the steering angles received from the first to third angle elements 131, 132, and 133 and a vernier algorithm, and traces movement of the first rotor 14 based on the determined reference steering angle. Then, by using the movement of the first rotor 14, first and second absolute steering angles may be calculated by using the reference steering angle and the relative steering angles received from the second and third angle elements 132 and 133, respectively.

The electronic control unit 20 calculates a difference between the first absolute steering angle and the second absolute steering angle, determines whether the calculated difference is within a preset reference difference, for example, 2.5 degrees, and averages the first absolute steering angle and the second absolute steering angle to calculate a final absolute steering angle if the calculated difference is within the preset reference difference.

The above-described electronic control unit 20 may include a reference steering angle determining unit 21, a first tracing unit 22, a second tracing unit 23, a calculation unit 24, a steering angle providing unit 25, a verifying unit 26, an alarming unit 27, and a reset unit 28.

The reference steering angle determining unit 21 determines a reference steering angle by using an absolute steering angle received from the first angle element 131 for measuring an absolute steering angle of the first rotor 14 and two relative steering angles received from the second and third angle elements 132 and 133 for measuring relative steering angles of the first rotor 14, and the vernier algorithm.

The first tracing unit 22 receives a reference steering angle from the reference steering angle determining unit 21, receives a relative steering angle from the second angle element 132, traces a first absolute steering angle rotated from the reference steering angle, and accumulates the traced first absolute steering angle.

The second tracing unit 23 receives the reference steering angle from the reference steering angle determining unit 21, receives a relative steering angle from the third angle element 133, traces a second absolute steering angle rotated from the reference steering angle, and accumulates the traced second absolute steering angle.

The calculation unit 24 calculates a difference between the first and second absolute steering angles accumulated from the first and second tracing units 22 and 23.

The verifying unit 26 verifies whether the difference between the first and second absolute steering angles calculated through the calculation unit 24 is within a predetermined reference difference. That is, when the difference between the first and second absolute steering angles is within the reference difference, the verifying unit 26 verifies that the first and second absolute steering angles are absolute steering angles in a normal state, and when the difference exceeds the reference difference, the verifying unit 26 verifies that the first and second absolute steering angles are absolute steering angles in an abnormal state such as a malfunction of the torque sensor or the rotor.

Then, if the difference between the first and second absolute steering angles exceeds the preset reference difference and does not exceed a predetermined number of times, the verifying unit 26 maintains the difference to a relative steering angle shortly before the exceeding of the predetermined number of times.

The verifying unit 26 determines whether the number of times by which the difference between the first and second absolute steering angles exceeds the reference difference exceeds a predetermined number of times.

If the difference between the first and second absolute steering angles exceeds the predetermined number of times, the alarming unit 27 may provide preset alarm information to the driver. The difference between the first and second absolute steering angles exceeds the predetermined number of times when the torque sensor or the first rotor 14 malfunctions.

If the difference between the first and second absolute steering angles does not exceed the predetermined number of times but a number of times less than a predetermined value is discontinuously counted, the reset unit 28 initializes the counted number of times to '0'.

The calculation unit 24 averages the first and second absolute steering angles verified by the above-described verifying unit 26, and calculates a final absolute steering angle. Accordingly, a final absolute steering angle satisfying a high reliability required by ISO026262 may be obtained.

The steering angle providing unit 25 outputs the final absolute steering angle calculated by the calculation unit 24 to a steering apparatus (not shown). The final absolute steering angle is used in an electronic control unit of the steering apparatus installed in the vehicle, but also may be used in an electronic control unit of the electric power steering system.

Hereinafter, a method of verifying a steering angle of the above-configured electric power steering system will be described with reference to FIG. 2.

Figure 2:
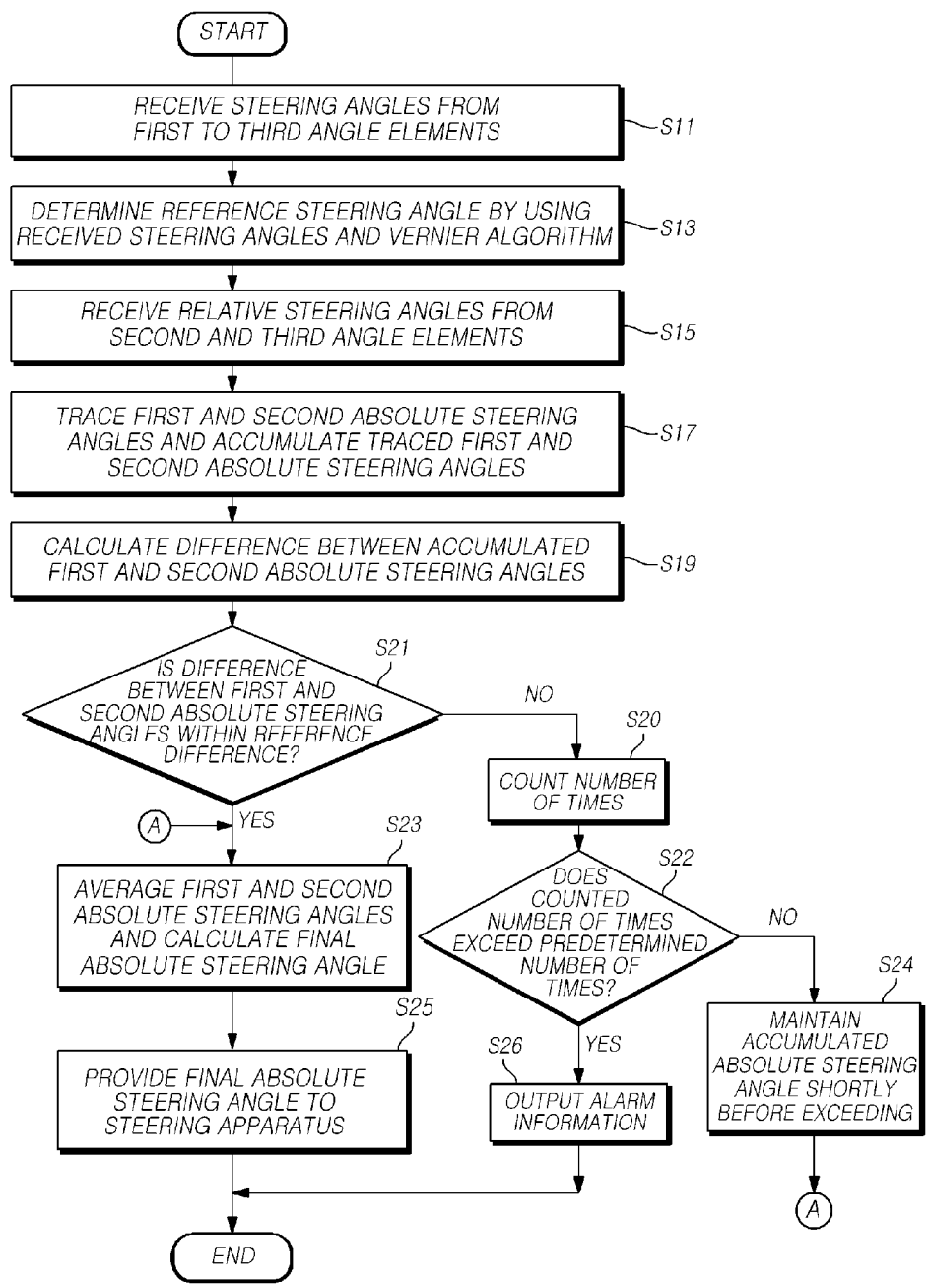
FIG. 2 is a flowchart illustrating a method for verifying a steering angle of an electric power steering system according to an embodiment of the present invention.

FIG. 2 is a flowchart illustrating the method for verifying a steering angle of an electric power steering system according to the embodiment of the present invention.

The electronic control unit 20 receives an absolute steering angle of the first rotor 14 from the first angle element 131 disposed parallel to the first rotor 14, and receives relative steering angles of the first rotor 14 from the second and third angle elements 132 and 133 disposed below the first rotor 14 (S11).

Next, the electronic control unit 20 determines a reference steering angle by using an absolute steering angle received by the first angle element 131, the relative steering angles received from the second and third angle elements 132 and 133, and a vernier algorithm (S13).

After the reference steering angle is determined, the electronic control unit 20 receives relative steering angles from the second and third angle elements 132 and 133, respectively (S15).

The electronic control unit 20 traces the first and second absolute steering angles rotated from the reference steering angle based on the received relative steering angle, and accumulates the traced first and second absolute steering angles (S17).

Next, the electronic control unit 20 calculates a difference between the accumulated first and second absolute steering angles (S19).

Next, the electronic control unit 20 determines whether the calculated difference between the first and second absolute steering angles is within a preset reference difference (S21).

When it is determined in step S21 that the calculated difference between the first and second absolute steering angles is within the preset reference difference (for example, 2.5 degrees), the electronic control unit 20 averages the first and second absolute steering angles and calculates a final absolute steering angle (S23).

Next, the electronic control unit 20 provides the calculated final absolute steering angle to the steering apparatus (S25).

If it is determined in step S21 that the calculated difference between the first and second absolute steering angles exceeds the preset reference difference, the electronic control unit 20 counts the number of times by which the difference between the first and second absolute steering angles exceeds the preset reference difference (S20).

Next, the electronic control unit 20 determines whether the counted number of times exceeds a predetermined number of times, for example, 10 times (S22).

If it is determined in step S22 that the counted number of times does not exceed the predetermined number of times, the electronic control unit 20 maintains the accumulated first and second absolute steering angles shortly before the exceeding (S24).

If it is determined in step S22 that the counted number of times exceeds the predetermined number of times, the electronic control unit 20 provides preset alarm information to the driver (S26). Meanwhile, the discontinuously counted number of times which does not exceed the predetermined number of times may be initialized to '0'.

The present invention is not limited to the above-described embodiments and those skilled in the art to which the present invention pertains can variously modify and change the present invention. The modifications and changes also fall within the scope of the present invention defined by the attached claims.

What is claimed is:

1. An electric power steering system comprising:
a torque sensor including a first rotor connected to an input shaft, a second rotor connected to an output shaft, a first angle element for measuring an absolute steering angle of the first rotor, and second and third angle elements for measuring relative steering angles of the first rotor; and
an electronic control unit for determining a reference steering angle based on the absolute steering angle and the relative steering angles received from the torque sensor, tracing and accumulating first and second absolute steering angles rotated from the reference steering angle based on the relative steering angles received from the second and third angle elements, and averaging the first and second absolute steering angles to provide the calculated final absolute steering angle when the difference between the accumulated first and second steering angles is within the preset reference difference.

2. The electric power steering system as claimed in claim 1, wherein when the difference between the first and second absolute steering angles exceeds the reference difference, the electronic control unit maintains the first and second absolute steering angles accumulated before the exceeding.

3. The electric power steering system as claimed in claim 2, wherein the electronic control unit counts a number of times by which the difference between the first and second absolute steering angles exceeds the reference difference, and outputs preset alarm information when the counted number of times exceeds a predetermined number of times.

4. A method for verifying a steering angle of an electric power steering system including a torque sensor including a first rotor connected to an input shaft, a second rotor connected to an output shaft, a first angle element for measuring an absolute steering angle of the first rotor, and second and third angle elements for measuring relative steering angles of the first rotor, the method comprising the steps of:
determining a reference steering angle based on the absolute steering angle and the relative steering angles received from the torque sensor;
tracing and accumulating first and second absolute steering angles rotated from the reference steering angle based on the relative steering angles received from the second and third angle elements;
determining whether the difference between the accumulated first and second absolute steering angles is within a preset reference difference; and
averaging the first and second absolute steering angles to provide the calculated final absolute steering angle when it is determined in the determining step that the difference between the accumulated first and second steering angles is within the preset reference difference.

5. The method as claimed in claim 4, further comprising, after the determining step, the step of, when the difference between the first and second absolute steering angles exceeds the reference angle, maintaining the first and second absolute steering angles before the exceeding.

6. The method as claimed in claim 5, wherein the providing step comprises the steps of:
- counting a number of times by which the difference between the first and second absolute steering angles exceeds the reference difference; and
- outputting preset alarm information when the counted number of times exceeds a predetermined number of times.

* * * * *